United States Patent [19]

Shenker

[11] 4,395,234

[45] Jul. 26, 1983

[54] OPTICAL SCANNING PROBE WITH MULTIPLE OUTPUTS

[75] Inventor: Martin Shenker, Pomona, N.Y.

[73] Assignee: Farrand Optical Co., Inc., Valhalla, N.Y.

[21] Appl. No.: 833,842

[22] Filed: Sep. 16, 1977

[51] Int. Cl.³ .............................................. G09B 9/08
[52] U.S. Cl. ........................................ 434/33; 434/43
[58] Field of Search .................. 35/11 A, 11 R, 12 N, 35/12 K, 25; 350/22, 26, 33, 34; 358/104

[56] References Cited

U.S. PATENT DOCUMENTS

| 3,131,487 | 5/1964 | Lyon et al. | 35/12 N |
| 3,283,418 | 11/1966 | Brewer et al. | 358/104 X |
| 3,401,233 | 9/1968 | Hellings | 358/104 |
| 3,459,465 | 8/1969 | Rosin et al. | 35/12 N X |
| 3,514,871 | 6/1970 | Tucker | 35/12 N |
| 3,522,667 | 8/1970 | Guillenchmidt et al. | 35/25 |
| 3,548,515 | 12/1970 | Simon | 35/12 N |
| 3,603,726 | 9/1971 | Garber | 35/12 N X |
| 3,932,702 | 1/1976 | Shelley et al. | 35/12 N |
| 4,055,004 | 10/1977 | Chase | 35/12 N |
| 4,074,930 | 2/1978 | Folsom et al. | 350/33 |

OTHER PUBLICATIONS

*Simulators & Simulation;* "Optical Scanning Probe Technology (Tutorial);" vol. 59; 1975; pp. 1-9.

Primary Examiner—Vance Y. Hum
Attorney, Agent, or Firm—Michael N. Meller; Anthony H. Handal

[57] ABSTRACT

A multiple output optical scanning probe consisting of a one power focussing telescope and a field splitting system with a plurality of imaging systems.

5 Claims, 2 Drawing Figures

OPTICAL SCANNING PROBE WITH MULTIPLE OUTPUTS

FIELD OF THE INVENTION

The present invention relates to optical scanning probes, and more particularly to an optical scanning probe with multiple outputs.

BACKGROUND OF THE INVENTION

Optical simulation applications such as aircraft flight simulation often employ an optical probe which is moved over a scale model of terrain at a variable altitude and which transmits an image of the terrain model to a sensor, e.g. a television camera. Optical scanning probes are comprehensively described in "Optical Scanning Probe Technology (Tutorial)" by Martin Shenker, *Procedings of the Society of Photo-Optical Instrumentation Engineers, Simulators & Simulation*, vol. 59, pp. 71–79 March, 1975.

For some time, there has been a need for an optical scanning probe having multiple field outputs in which each of the outputs is centered around its own center of perspective so that each output can be used relatively free of distortion relative to its associated display; each field having its own perspective axis and mapping around its own axis, rather than having the side fields imaged assymmetrically around the center of a central field of view.

In the past, when it was desired to present to the user of the simulator probe, e.g. to a helicopter pilot trainee, two fields of view, one forward and one to the side, two separate probes have been utilized, requiring, in addition to duplication of the probes, duplication of the model boards, gantries for positioning the probes, illumination systems and computer inputs.

Also in the past there have been wide-angle scanning probes in which the output has been divided among three sensors, e.g. television cameras. To display such a system to the observer without gross distortion, two different methods have been used in the past.

One method was to use T.V. projectors to project the three images onto one screen. Such systems have used a concave front projection screen usually of spherical or cylindrical shape with the observer at the center of curvature of the display screen. The other method utilized projection onto a single rear projection screen positioned at the focal surface of a single infinity display system.

In the front projection screen system gross amounts of assymmetric distortion correction had to be introduced in the T.V. electronics to correct the image for the side fields.

In the rear projection system a smaller amount of distortion correction was usually required but it was still assymmetric.

In the case where it was desired to present these outputs as three separate displays, each with its own axis, a large amount of assymmetric distortion correction had to be introduced into each display that did not have its axis parallel to the original probe axis.

This invention provides a single, wide field of view probe with an improvement that gives an observer multiple fields of view. Each of the output fields of view exhibits image quality, low altitude capability and mapping similar to that which is obtainable with separate probes. More than two output fields of view are possible with this invention as will be described hereinafter.

The customary scanning probe functions of pitch, roll, heading, focus (and tilt-focus when used) remain unchanged, and are introduced in a conventional manner.

SUMMARY OF THE INVENTION

The present invention provides a multiple output optical scanning probe having an entrance pupil and an exit pupil. The optical elements between these pupils comprise a relatively distortion-free, one power, focussing telescope and the output collimated image at the exit pupil is divided into a plurality of fields which are transmitted to a corresponding plurality of imaging systems.

Figure 1:
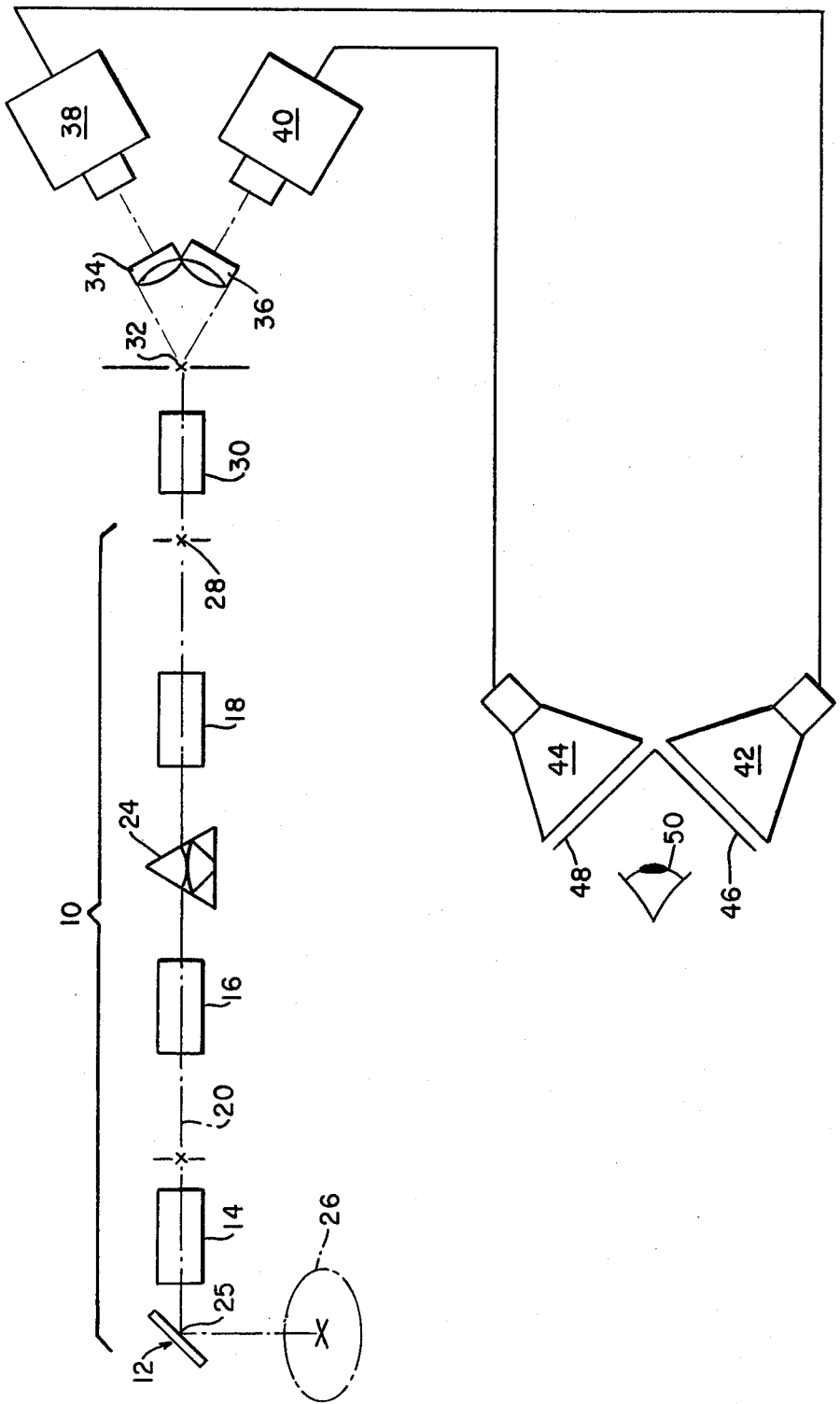
FIG. 1 is a schematic diagram of a first specific embodiment in accordance with the present invention.

DESCRIPTION OF THE SPECIFIC EMBODIMENTS:

FIG. 1 shows in schematic form the basic elements of an optical scanning probe 10 as described in the aforementioned technical article. The principal components of scanning probe 10 are a pitch mirror 12 which is rotatable (by means not shown) to simulate a desired pitch, an objective lens system 14, and at least one relay system which comprises a focussing collimating lens 16 and a reimaging lens 18. Element 12, can rotate by itself or elements 12, 14 and 16 can rotate together to provide heading. The collimating lens 16 is movable along an optical axis 20 as indicated by the arrows 22 to provide focussing. Finally, an image rotating and derotating system or roll prism 24 is also aligned with the axis 20 to give roll simulation in the scanning probe 10.

The probe 10 can be moved over a model board (not shown) by a gantry (also not shown), and the scene 26 viewed at an entrance pupil 25 is reimaged at an image surface 28 along the probes' optical axis 20.

The first specific embodiment of this invention in FIG. 1 shows a collimating lens system 30 which is substantially similar to the objective lens system 14 and which is positioned along the axis 20 and focussed on the image surface 28 to recollimate the image at surface 28. An exit pupil 32 is also formed. The elements of the probe 10 and collimator 30 form a relatively distortion-free, one power telescope so that the scene 26 viewed at the entrance pupil 25 is seen subtending the same field at the exit pupil 32, but now focussed at infinity. Effectively, an eye placed at point 32 sees the object world at the same angles as it would if it were positioned at the entrance pupil 25, the only differences being that the scene viewed at 32 is always focussed at infinity, and has the roll, pitch and heading of probe 10 introduced.

Two lens systems 34 and 36 are positioned at fixed angles to the optical axis 20 to serve as imagers of two portions of the angular field seen at the exit pupil 32. The images from lens systems 34 and 36 are transmitted respectively to television cameras 38 and 40 which supply through appropriate and well-known techniques the two different image fields to cathode ray tube displays 42 and 44, respectively. The displays 42 and 44, in turn, serve as inputs for infinity display systems 46 and 48, such as those described in U.S. Pat. No. 3,443,858.

An observer 50 situated before the display systems 46 and 48 is then able to observe the object scene 26 from two different fields of view merely by moving his head. Each of the images displayed on the screens 46 and 48 is centered around its own center of perspective, and no special assymmetric television corrections are required.

Figure 2:
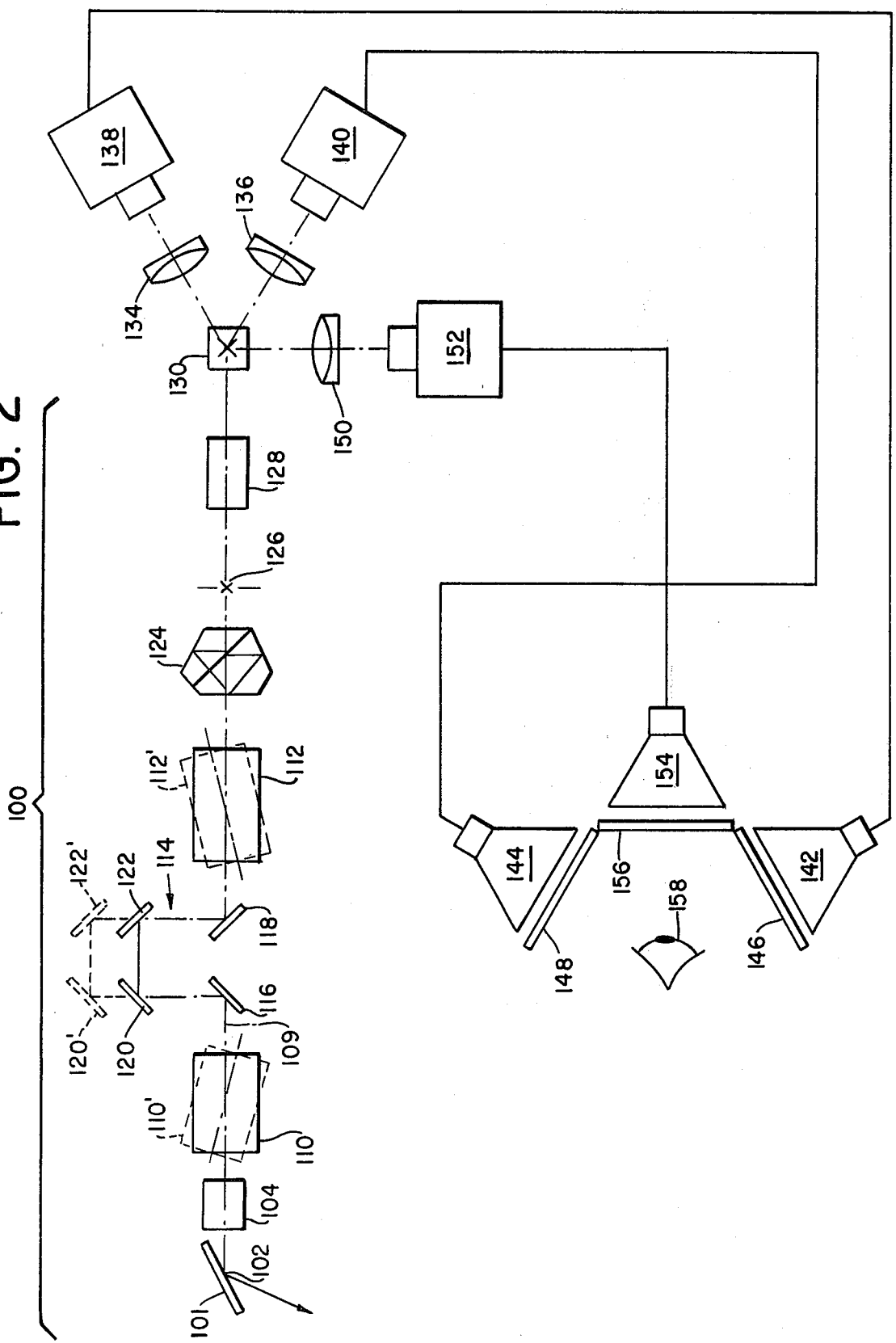
FIG. 2 is a schematic diagram of a second specific embodiment in accordance with the present invention.

A second specific embodiment of the invention shown in FIG. 2. An optical scanning probe 100 having two tilt relay tilt-corrected components as described in the aforementioned technical article is shown linked to a visual display system having three separate displays. In the first system shown in FIG. 1, it is possible that the junction of the infinity displays 46 and 48 can present non-uniformities in image intensity and continuity arising from the non-uniformity of image intensity over the adjacent edges of the fields covered by the lens systems 34 and 36. It is therefore possible that the observer 50 may be aware of non-uniformities or discontinuities (noise) at the junction of display screens 46 and 48.

FIG. 2 shows an optical scanning probe similar in function to the probe 10 shown in the first embodiment. The probe 100 has an entrance pupil 101 and comprises an adjustable pitch prism mirror 102, and an objective lens system 104, which direct the desired image of the object board (not shown) along the probe's optical axis 109 to a first tilt relay lens system 110 whose axis is adjustably inclinable to the axis of the system as indicated by the dotted outline 110'. The image passes on to a second tilt-focus relay lens 112 through a focussing "trombone" 114. The first and second tilt-focus lenses 110 and 112 are mechanically linked so that they tilt through the same angle (in opposite directions); thus the inclined dotted position 112' of the second tilt-focus lens 112 corresponds to the position 110' of the first tilt-focus lens 110.

The focussing "trombone" arrangement 114 comprises two mirrors 116 and 118 fixed relative to the axis 109 and two mirrors 120 and 122 movable relative to mirrors 116 and 118 (as indicated by the dotted outlines 120' and 122'), thereby changing the optical path distance along which the image is transmitted along axis 109. The "trombone" focussing arrangement 114 is varied as the tilt-focus relay lens systems 110 and 112 are inclined so that the front and rear conjugates of the tilt-focus lenses remain fixed with varying tilt angles. The "trombone" focussing arrangement also functions to correct for slant range variations.

The object as seen at entrace pupil 101 is transmitted along through a roll prism 124 and then to an image surface 126. A collimator 128 which is substantially similar to the objective lens system 104 is positioned next on the axis 109 and focussed on the image surface 126 to recollimate the image. The probe 100 is essentially a distortion-free, one power, focussing telescope. As in the first specific embodiment, the scene viewed at the entrance pupil 101 is also present (and subtending the same field angle) at an exit pupil 132, but the image at exit pupil 132 is always focussed at infinity. The image also has roll, pitch, heading and tilt correction introduced through controls (not shown) associated with the probe 100.

A beam-splitting prism 130 positioned on the axis 109 at an exit pupil 132 formed by the components of probe 100 divides the light available at exit pupil 132 so that first and second lens systems 134 and 136 positioned at fixed angles relative to the optical axis 109 image two portions of the angular field seen at pupil 132. The images from the lens systems 134 and 136 are transmitted respectively to television cameras 138 and 140 and these send the two images on to cathode ray tube displays 142 and 144 which serve as inputs for infinity display systems 146 and 148, respectively. The infinity displays 146 and 148 enclose the same angle as do the first and second lens systems 134 and 136, reproducing the angles in object space at the entrance pupil 101 relative to the probe axis 109.

The beam-splitting prism 130 also directs the collimated image at exit pupil 132 in a direction normal to the plane of the paper toward a third lens system 150 which images the central portion of the probe image and directs it toward a third television camera 152 and cathode ray tube 154 and thence to a central in-line infinity display 156 positioned between displays 146 and 148. An observer at position 158 can observe a continuous field of view extending from the outermost limits of the angular fields viewed by lens systems 134 and 136. The use of the beam-splitting prism 130 reduces the image intensity available to lens systems 134 and 136 and lens system 150, but the use of the central display image path through elements 150, 152, 154 and 156 permits the overlap of the central and "side" views to eliminate the image and discontinuity problems noted in connection with the first specific embodiment.

It should also be noted that the three display image paths shown in FIG. 2 need not all lie in the same plane. Thus, if the observer at point 158 were to simulate a helicopter pilot trainee, the two screens 146 and 148 could represent side windows of a helicopter, while appropriate positioning of the beam-splitter 130 relative to the lens systems 134 and 136 the image on screen 156 could simulate the field of view from an overhead forward window of the helicopter.

The beam-splitter prism 130 need not be positioned at the exit pupil, since in accordance with the present invention it need only be positioned on the probe axis 109 after the objective 104. However, in such event, all the movable probe elements must be duplicated after the probe field has beed divided, and the arrangement shown in FIG. 2 represents what is believed to be the most advantageous, i.e. the beam-splitter prism is positioned following all the movable elements of the probe.

What is claimed is:

1. A multiple output scanning probe having an entrance pupil, an exit pupil and an optical axis, the optical elements between said pupils comprising a relatively distortion-free telesope of approximately one power, said telescope including an image collimating element, wherein a collimated output at the exit pupil is divided into a plurality of images by a plurality of imaging systems, each of said imaging systems received a portion of the output field to provide a true angular image of said portion of the output field.

2. A multiple output optical scanning probe according to claim 1 wherein at least one of said imaging systems has its optical axis at an angle with respect to the optical axis of said probe.

3. A multiple output optical scanning probe according to claim 1 further comprising at least one optical beam-splitter positioned between said entrance pupil and the exit pupil of said probe.

4. A multiple output optical scanning probe according to claim 3 wherein said beam-splitter directs a fraction of the light along a first path to at least one imaging system, and along a second path to at least another imaging system, the image field transmitted by said other imaging system substantially overlapping the image field transmitted by said one imaging system.

5. A multiple output optical scanning probe according to claim 1 wherein at least one of said imaging systems comprises:

(a) a lens system focussed on at least a portion of the collimated image at the exit pupil and transmitting said portion of said image to (b) a television camera system adapted to present said portion of said image to (c) a cathode ray tube display which is arranged as an input to (d) an in-line infinity display for viewing by an observer.

* * * * *